United States Patent [19]
Kurio

[11] Patent Number: 5,774,640
[45] Date of Patent: Jun. 30, 1998

[54] METHOD AND APPARATUS FOR PROVIDING A FAULT TOLERANT NETWORK INTERFACE CONTROLLER

[75] Inventor: Kay M. Kurio, Austin, Tex.

[73] Assignee: Tandem Computers Incorporated, Cupertino, Calif.

[21] Appl. No.: 781,422

[22] Filed: Oct. 21, 1991

[51] Int. Cl.⁶ .................................................. G06F 13/00
[52] U.S. Cl. ...................................................... 395/182.02
[58] Field of Search ............................... 371/7, 8.1, 11.1, 371/8.2, 11.2; 364/238.2, 238.3, 240.7, 281.9, 944.2; 395/275, 182.02

[56] References Cited

U.S. PATENT DOCUMENTS

| | | | |
|---|---|---|---|
| 4,847,837 | 7/1989 | Morales et al. ............................ | 371/8 |
| 5,016,244 | 5/1991 | Massey, Jr. et al. ...................... | 370/16 |
| 5,091,847 | 2/1992 | Herbermann ............................. | 395/575 |

OTHER PUBLICATIONS

"ISO 84d International Organization for Standardization, 'Open System Interconnection–Basic Reference Model; ISO 7498, 1984" pp. 235–247.
"Streams Primer" pp. 1–1 to 1–3 Prentice Hall, publisher.
"A Highly Available Network File Server" USENIX–Writer '91, Dallas, TX pp. 199–205.
"Integrity S2: A Fault–Tolerant Unix Platform," by D. Jewett, Nov. 27, 1990, available from Tandem Computers, Inc.
"A Highly Available Network File Server" USENIX, 21–25 Jan. 1991, pp. 199–205, Bhide et al.

*Primary Examiner*—Robert W. Beausoliel, Jr.
*Assistant Examiner*—Norman Wright
*Attorney, Agent, or Firm*—Graham & James LLP

[57] ABSTRACT

A fault tolerant network interface is achieved by providing primary and alternate network controllers, dual transceivers, dual cables and dual connectors. This fault tolerant interface is driven by a logical device driver which controls the physical device drivers for the primary and alternate network controllers. The logical device driver causes periodically polling messages to be sent between the primary and alternate network controllers to determine if a fault has occurred in either of these network controllers. Faults detected are logged and error recovery actions are provided according to the nature of the faults detected. If the primary network controller is found to be faulty, the secondary network controller will assume the physical address of the primary network controller and provides the services of the primary network controller while the primary network controller is effectively removed from the network.

18 Claims, 18 Drawing Sheets

Microfiche Appendix Included
(1 Microfiche, 62 Pages)

FIG. 7A

```
int
egl_loop(pdev_t *pdev, int test)
{
    register struct egl_softc *egl= (struct egl_softc *) pdev->pd_dsdatap;
    register struct ifnet  *nif   = &egl->egl_if;
    EGL_SHIO *shio = egl->egl_shio;
    EGL_ED_IOPB *iopb = (EGL_ED_IOPB *) &shio->sh_MCE_IOPB;
    EGL_ED_IOPB temp_ed_iopb;
    EGL_ED_IOPB riopb;
    EGL_CQE temp_cqe;
    register int i;
    register struct ftenet_egl *eaglep;
    register struct ftenet *ftep;
    int vme_addr, error, testIG;
    int where=0;

#ifdef PDBXHOOK
    if (0) {
        tstat = egl_readshio(pdev, rsrc, rdst, rcnt);
        tstat = egl_writeshio(pdev, wsrc, wdst, wcnt);
    }
endif PDBXHOOK ftep = egl->egl_ftep;

if (pdev->pd_state != CF_STATE_ONLINE)
        return(CODE_ERROR);
    eglstop(pdev);
```

FIG. 7B

```
egl->egl_state = EGL_LOOPBACK;
if (ftlan_ctlr_init_failed ||
    (eglsetup(pdev, NO_RESET) != CODE_OK)) {
        event_log(EGL_EMASK, MDS_FTLAN, FT_LAN_DEV,
            LAN_CNTLR_INITIALIZATION_FAILED, -1,
            (struct timeval *)0, pdev,
            "ftenet%d: enet%d controller initialization failed.",
            egl->egl_ftep->ft_unit,pdev->pd_ctrlnum);
        egl_downctlr(pdev);
        event_log(EGL_EMASK, MDS_LAN, EGL_LAN_CNTLR, LAN_CNTLR_DOWN
            (struct timeval *) 0, pdev, "%Benet%d: controller down",
            sizeof(where), &where, pdev->pd_ctrlnum);
        switchem(ftep,egl);

return(CODE_ERROR);
}
/*
 Make the MCE IOPB
 */
bzero(&temp_ed_iopb, sizeof(EGL_ED_IOPB));

/* Perform Extended Diag - 0x40                              */
temp_ed_iopb.ed_iopb_CMD = CNTR_DIAG;

/* Bytes 8-15 contain the test number - loopback = 0x0C */
B_OPT_TEST(temp_ed_iopb.ed_iopb_OPTION) = EDIAG_LOOP;
W_VECT(temp_ed_iopb.ed_iopb_NVCT) = 0;
W_VECT(temp_ed_iopb.ed_iopb_EVCT) = 0;
temp_ed_iopb.ed_iopb_DMTS = 0x4;
temp_ed_iopb.ed_iopb_HBUF = 0x4;
```

FIG. 7C

```
/*Specify the mode of the loopback test - external/internal */
if (test == EXTERNAL)
         temp_ed_iopb.ed_iopb_HDATA = EDIAG_LOOP_MODE;
else /* internal */
         temp_ed_iopb.ed_iopb_HDATA = IDIAG_LOOP_MODE;
temp_ed_iopb.ed_iopb_PATTERN    = 0;

egl_Writeshio(pdev, (caddr_t)&temp_ed_iopb, (ioaddr_t)iopb,
              sizeof(EGL_ED_IOPB));
/*
Make the MCE
*/
temp_cqe.cqe_CTAG = 0x0,           /* for now */
temp_cqe.cqe_IOPB_ADDR = 0_MCE_IOPB;
temp_cqe.cqe_RES0 = 0;
temp_cqe.cqe_WORK_QUEUE = 0;
egl_Writeshio(pdev, (caddr_t)&temp_cqe,
              (ioaddr_t)&shio->sh_MCE, sizeof(temp_cqe));

CQE_GO(shio->sh_MCE.cqe_QECR);          /* fire one! */ if(eglwait(&shio->sh_CRB,0,pdev) & (M_CRSW_ER | M_CRSW_EX))
{
        error = CODE_ERROR;
        egl_Readshio(pdev, (ioaddr_t)&egl_shio->sh_RET_IOPB,
                     (caddr_t)&riopb, sizeof(riopb));
}
else
        error = CODE_OK;
```

FIG. 7D

```
egl->egl_state = EGL_RUNNING;
/*egl_online(egl);*/
if (nif->if_flags & IFF_UP)
{
    if (egl->egl_osicall != NULL && nif->if_addrlist == NULL)
    {
        eglosint =1;
        egl->egl_needarp =1;
    }
    egl_init(pdev->pd_ctrlnum, NO_RESET);
}
else
    eglsetup(pdev, NO_RESET);
return(error);
}
```

FIG. 8

```c
if (egl->egl_ftep)
{
    eaglep = &eagle[egl->egl_ftep->ft_unit];
    ftep = egl->egl_ftep;
}
/* if egl is not a component or if it is a component and the
   alternate , then use factory assigned address   */
if (egl->egl_ftep == NULL || (egl->egl_ftep && ITS_ALT()))
{
    /* read default physical address */
    egl_Readshio(pdev, (ioaddr_t)shio->sh_CSTB.cstb_PHY,
                 (caddr_t)tempPHY, sizeof(tempPHY));
    if (bcmp(tempPHY, egl->egl_PHY, sizeof(tempPHY)))
        egl->egl_needarp = 1;
    bcopy(tempPHY, egl->egl_PHY, sizeof(tempPHY));
}
else /* its a component    use ftenet Physical address    */
{
    if(bcmp(egl->egl_ftep->ft_phyaddr, egl->egl_PHY,
            sizeof(egl->egl_ftep->ft_phyaddr)))
        /* only arp if its the primary device  - see egl_init  */
        egl->egl_needarp = 1;
    bcopy(egl->egl_ftep->ft_phyaddr, egl->egl_PHY,
          sizeof(egl->egl_ftep->ft_phyaddr));
}
```

FIG. 9

```
if ( ftlan_failed_to_start_qmode || (qstarttimeout == 0 )) {
    if (!egl->egl_ftep))
        event_log(EGL_EMASK, MDS_LAN, EGL_LAN_CNTLR,
            LAN_FAILED_TO_START_QMODE, -1, (struct timeval *)0,
            pdev, "enet%d: failed to start queue mode", unit);
    else
    {
        event_log(EGL_EMASK, MDS_FTLAN, FT_LAN_DEV,
            FTLAN_FAILED_TO_START_QMODE, -1, (struct timeval *)0,
            pdev,
            "ftenet%d: enet%d failed to start queue mode",
            egl->egl_ftep->ft_unit, unit);
        egl_downctlr(pdev);
        switchem(ftep,egl);
    }
}
```

FIG. 10

```
/* if this is a polling packet save timestamp        */
if (egl->egl_ftep)
{
    ftep = egl->egl_ftep;
    eaglep = &eagle[ftep->ft_unit];
    if (eaglep->ft_pflags & FTLAN_POLL_PKT)
    {
        if (ITS_PRIMARY())
            eaglep->ft_p_timestamp = egl->egl_txtimeout[index];
        else /* its the alternate */
            eaglep->ft_a_timestamp = egl->egl_txtimeout[index];
    }
}
```

FIG. 11

```
if (ftlan_config_cmd_did_not_complete ||
(eglwait(&shio->sh_CRB,0,pdev) & (M_CRSW_ER | M_CRSW_EX)))
{
    if (!egl->egl_ftep)
        event_log(EGL_EMASK, MDS_LAN, EGL_LAN_CNTLR,
            LAN_CONFIG_CMD_DID_NOT_COMPLETE, -1,
            (struct timeval *) 0, pdev,
            "enet%d: configuration command timed out",
            pdev->pd_ctrlnum);
    else
        event_log(EGL_EMASK, MDS_FTLAN, FT_LAN_DEV,
            FTLAN_CONFIG_CMD_DID_NOT_COMPLETE, -1,
            (struct timeval *) 0, pdev,
            "ftenet: enet%d configuration command timed out"
            ,egl->egl_ftep-<ft_unit, pdev->pd_ctrlnum);
```

FIG. 12A

```
if (riob.iopb_LAN1 & LANCE_TERR || debug_error)
{
    if (egl->egl_ftep)
    {
        ftep = egl->egl_ftep;
        if (riopb.iopb_LAN3 & LANCE_TBUFF
            || (ftlan_lance_ptbuffer &&(!ITS_ALT()))
            || (ftlan_lance_atbuffer && ITS_ALT()))
            event_log (EGL_EMASK, MDS_FTLAN, FT_LAN_DEV,
                FTLAN_TRANSMIT_BUFFER_ERROR, -1, (struct timeval *) 0,pdev
                "ftenet%d: enet%d had a LANCE transmit buffer error",
                egl->egl_ftep->ft_unit, pdev->pd_ctrlnum);
```

```
        else if (riopb.iopb_LAN3 & LANCE_TUFLO
                || (ftlan_lance_ptunderflow && (!ITS_ALT()))
                || (ftlan_lance_atunderflow && ITS_ALT()))
            event_log (EGL_EMASK, MDS_FTLAN, FT_LAN_DEV,
                FTLAN_UNDERFLOW_ERROR, -1, (struct timeval *) 0,pdev,
                "ftenet%d: enet%d had a LANCE transmit underflow error",
                egl->egl_ftep->ft_unit, dev->pd_ctrlnum);
        else if (riopb.iopb_LAN3 & LANCE_TLCOL
                || (ftlan_lance_ptlate_collision && (!ITS_ALT()))
                || (ftlan_lance_atlate_collision && ITS_ALT()))
            event_log (EGL_EMASK, MDS_FTLAN, FT_LAN_DEV,
                FTLAN_LATE_COLLISION_ERROR, -1, (struct time *) 0,pdev,
                "ftenet%d: enet%d had a LANCE transmit late collision error",
                egl->egl_ftep->ft_unit, pdev->pd_ctrlnum);
        else if (riopb.iopb_LAN3 & LANCE_TLCAR
                || (ftlan_lance_ptloss_of_carrier && (!ITS_ALT()))
                || (ftlan_lance_atloss_of_carrier && ITS_ALT()))
            event_log (LOG_ONLY, MDS_FTLAN, FT_LAN_DEV,
                FTLAN_LOSS_OF_CARRIER, -1, (struct timeval *) 0,pdev,
                "ftenet%d: enet%d had a LANCE transmit loss carrier error",
                egl->egl_ftep->ft_unit, pdev->pd_ctrlnum);
        else if (riopb.iopb_LAN3 & LANCE_TRTRY
                || (ftlan_lance_ptretry && (!ITS_ALT()))
                || (ftlan_lance_atretry && ITS_ALT()))
            event_log (EGL_EMASK, MDS_FTLAN, FT_LAN_DEV,
                FTLAN_RETRY_EROR, -1, (struct timeval *) 0,pdev,
                "ftenet%d: enet%d had a LANCE transmit retry error",
                egl->egl_ftep->ft_unit,pdev->pd_ctrlnum);
        eaglep->ftenet_if.if_oerrors++;
```

```
        }
        egl->egl_if.if_oerrors++;

*    *    *

/*
 * if interrupt is on a component and interface is in polling mode
 *    call poll_terror routine
 */
if (egl->egl_ftep && eaglep->ft_pflags & FTLAN_POLL_ON)
{
    if (was_error)
             lan3 = riopb.iopb_LAN3;
    else
             lan3 = 0;
    poll_terror(egl,index,lan3);
}
```

FIG. 13

```
/* it's an OSI packet                                        */
if (eh->ether_type <= ETHERMTU)
{
    if (egl->egl_osicall != NULL)
    {
        if (egl->egl_ftep)
        {
            if ( ITS_PRIMARY() )   /* ftenet and from primary */
            {
                (*egl->egl_osicall)(length, eh,
                                    eaglep->ftenet_if.if_unit);

eaglep->ftenet_if.if_ipackets++;
            }
            else   /* from the ALTERNATE - discard */
                eaglep->ftenet_if.if_idiscards++;
        }
    }
 * * *
if (egl->egl_if.if_addrlist == NULL &&
    eh->ether_type != ETHERTYPE_FPOLL)
{
    if (egl->egl_ftep)
        eaglep->ftenet_if.if_idiscards++;
    egl->egl_if.if_idiscards++;
    eglhangrcv(pdev, index);
    CRB_CLR_DONE(crb->crb_CRSW);
    return(0);
}
```

FIG. 14A

```c
    if (egl->egl_ftep)
    {
        eaglep = &eagle[egl->egl_ftep->ft_unit];
        ftep = egl->egl_ftep;

/* Since MIDAS is not performing trend analysis on CRC and Framing */
/* errors, don't log them for A20 release                          */
/*
        if (crbcopy.temp_RET_IOPB.iopb_LAN1 & LANCE_RFRAM
            || (ftlan_lance_pframing && (!ITS_ALT()))
            || (ftlan_lance_aframing && ITS_ALT()))
        {
            event_log (EGL_EMASK, MDS_FTLAN, FT_LAN_DEV,
            FTLAN_RECEPTION_FRAMING_ERROR, -1,
            (struct timeval *) 0, pdev,
            "ftenet%d: enet%d had LANCE receive framing error\n.",
            egl->egl_ftep->ft_unit,pdev->pd_ctrlnum);
        }
        if (crbcopy.temp_RET_IOPB.iopb_LAN1 & LANCE_RCRC
            || (ftlan_lance_pcrc && (!ITS_ALT()))
            || (ftlan_lance_acrc && ITS_ALT()))
        {
            event_log (EGL_EMASK, MDS_FTLAN, FT_LAN_DEV,
            FTLAN_RECEPTION_CRC_ERROR, -1,
            (struct timeval *) 0, pdev,
            "ftenet%d: enet%d had LANCE receive CRC error\n.",
            egl->egl_ftep->ft_unit,pdev->pd_ctrlnum);
        }
        if (crbcopy.temp_RET_IOPB.iopb_LAN1 & LANCE_ROFLO
            || (ftlan_lance_poverflow && (!ITS_ALT()))
            || (ftlan_lance_aoverflow && ITS_ALT()))
        {
            event_log (EL_DIAG, MDS_FTLAN, FT_LAN_DEV,
```

FIG. 14B

```c
                FTLAN_OVERFLOW_ERROR, -1, (struct timeval *)0,
                pdev,
                "ftenet%d: enet%d had LANCE receive overflow error\n.",
                egl->egl_ftep->ft_unit,pdev->pd_ctrlnum);
        } if (crbcopy.temp_RET_IOPB.iopb_LAN1 & LANCE_RBUFF
                || (ftlan_lance_prbuffer && (!ITS_ALT()))
                || (ftlan_lance_arbuffer && ITS_ALT()))
        {
                event_log (EGL_EMASK, MDS_FTLAN, FT_LAN_DEV,
                FTLAN_RECEPTION_BUFFER_ERROR, -1,
                (struct timeval *)0,pdev,
                "ftenet%d: enet%d had LANCE receive buffer error\n.",
                egl->egl_ftep->ft_unit,pdev->pd_ctrlnum);
                pdev0 = eaglep->ft_egl0->egl_pdp;
                pdev1 = eaglep->ft_egl1->egl_pdp;
                /* only down and switch if controller is primary */
                /* and reliable interface is ONLINE              */
                if (ITS_PRIMARY() &&
                        (pdev0->pd_state == CF_STATE_ONLINE) &&
                        (pdev1->pd_state == CF_STATE_ONLINE))
                {
                        egl_downctlr(pdev);
                        switchem(ftep,egl);
                        return(0);
                }
        } eaglep->ftenet_if.if_ierrors++;
```

```
case ETHERTYPE_FPOLL:
    m->m_act = 0;
    poll_input(ftep,egl,m);
    return;
```

FIG. 15

```
if (egl->egl_ftep)
    switchem(egl->egl_ftep,egl);
```

FIG. 16

```
if (egl->egl_ftep)
    switchem(egl->egl_ftep,egl);
```

FIG. 17

```
if (egl->egl_ftep)
    switchem(egl->egl_ftep,egl);
```

FIG. 18

METHOD AND APPARATUS FOR PROVIDING A FAULT TOLERANT NETWORK INTERFACE CONTROLLER

CROSS REFERENCE TO MICROFICHE APPENDIX A

Microfiche Appendix A, which is part of the present disclosure, is a microfiche appendix consisting of one sheet of microfiche having a total of 62 pages. Microfiche Appendix A is a listing of computer programs and related data in one embodiment of the present invention, which is described more completely hereinbelow.

A portion of the disclosure in this patent document contains material which is subject to copyright protection. The copyright owner has no objection to the fascimile reproduction by anyone of the patent document or the patent disclosure, as it appears in the Patent and Trademark Office patent files or records, but otherwise reserves all copyrights whatsoever.

1. Field of the Invention

This invention relates to computer networks and in particular, relates to the interface controllers in a station on a computer network.

2. Background of the Invention

The communication protocol levels described hereinbelow follow the conventions of the generally accepted ISO (International Standards Orgnanization) model. A discussion of the ISO model may be found in "Iso84d International Organization for Standardization. 'Open System Interconnection—Basic Reference Model', ISO 7498, 1984", hereby incorporated by reference to provide technical background information.

Local area networks are widely used and many advances have been made in recent years. U.S. Pat. No. 4,823,122, entitled "Local Area Network for Digital Data Processing System" to Mann et al, filed Aug. 24, 1987 and issued Apr. 18, 1989 provides some examples of the recent developments.

Some computer networks, such as Ethernet, are inherently unreliable at the lowest levels. Ethernet, which is a broadcast bus technology that allows all stations on the network to transmit and receive over a single communication channel, provides only "best-effort" delivery service. In Ethernet, a data packet sent over the network is not guaranteed to be received by the recipient. For example, at the link and physical levels (i.e. layers 2 and 1, respectively, of the ISO model) of Ethernet, data packets arriving at a recipient computer are discarded in numerous situations including when the resources are exhausted, e.g. the recipient computer's receive buffer is full, or when a hardware error occurs, e.g. a CRC (cyclic redundancy check) error.

In the prior art, unreliable networks depend upon higher level communication protocols, e.g. at the transport level (i.e. layer 4 of the ISO model), to provide necessary error recovery mechanisms such as retransmission or error correction. Indeed, the transport layer 4 is intended to provide reliable, ordered, connection-oriented data delivery. Some examples of such higher level communication protocols include TCP (Transmission Control Protocol), which is a part of the DARPA (Defense Advanced Research Projects Agency) TCP/IP (Transmission Control Protocol/Internet Protocol) protocol suite, and TP4, which is a part of the ISO-OSI (ISO's Open System Interconnection) protocol suite.

However, at these higher level protocols, it is both inefficient and sometimes impossible to provide error recovery from faults occuring at the lowest levels. One example of such lower level faults is a hardware failure in the network interface. Without modifications of these higher level communication protocols, existing standard high level communication protocols (i.e. layer 4 and above) are incapable of performing a detailed diagnosis of the lower level fault and consequently, is incapable of efficiently recovering from such a fault.

In fact, with no effective means of recovering from a hardware level fault, a higher level protocol typically "times out", i.e. breaks a connection after a predetermined period of time. Consequently, the application software, such as a file transfer utility, will fail.

Many applications, generally known as "fault-tolerant computing," require high reliability and availability of the computer system. A typical goal of such a system is to provide protection against "single points of failure," i.e. failures of the system due to a single fault in a component of the system. To achieve this goal, for example, "highly available file servers" can be used to access mirrored disks, so that the stored information remains available even when one of the file servers or disks malfunctions or otherwise becomes unavailable. An example of such a system, which provides control of the redundancy at the file system level, is described in the article "A Highly Available Network File Server," by A. Bhide et al, published in USENIX, Winter '91, Dallas, Tex., pp. 199–205. This article by A. Bhide et al is hereby incorporated by reference to provide technical background information.

SUMMARY OF THE INVENTION

In accordance with the present invention, a method and a fault-tolerant network interface for connecting a computer to a network are provided by first and second network connecting devices. In one embodiment, for identification on the network, the first and second network connecting devices are initially provided first and second Media Access Control ("MAC") addresses.

Initially, data flow between the computer and the network is through the first network connecting device under control of a device driver. The first and second network connecting devices each include means for reporting tranmission and reception faults. When a fault is detected, the device driver disables the first network connecting device, and reassigns the first MAC address to the second network connecting device. Thereafter, data flow between the computer and the network are provided through the second network connecting device. The fault detection, the MAC address reassignment, and the transition to the second network connecting device all occur within the time-out period of the higher level protocols, so that a connection at a higher level protocol is not disrupted.

In one embodiment of the present invention, the device driver provides a polling protocol for sending messages periodically between the first and second connecting devices so as to determine if a fault has occured in one or both of the network connecting devices. In this embodiment also, a diagnostic command to the network connecting device is periodically sent to ensure communication integrity between the network connecting device and the host computer.

In an inherently unreliable network environment, the present invention prevents a single point of failure in a network interface from impeding the host computer's access to the network. The advantages of the present invention are achieved without requiring other computers in the network to use a customized protocol to communicate with the fault-tolerant computer. The present invention further provides such fault-tolerant access to the network at a protocol level low enough to allow distinguishing betweeen a number of low level faults and recovering accordingly from these faults, without requiring any modification to higher level protocols, such as TCP/IP or TP4. Consequently, existing standard higher level protocols can be used in a fault-tolerant computer of the present invention. The present invention provides such fault-tolerance without degradation of performance, nor noticeable interruption of service at a user level (e.g. the "session", or layer 5 level).

The present invention is better understood upon consideration of the following detailed description and the accompanying drawings.

BRIEF DESCRIPTION OF THE DRAWINGS

FIG. 7a–d is an example of a procedure which causes an Ethernet controller to run an external loop-back test.

FIG. 8 is an example of a code segment in a physical Ethernet device driver which sets the MAC address on the Ethernet controller to the factory-assigned address if the Ethernet controller is an alternate controller, and assigns a system unique MAC address if the Ethernet controller is a primary controller.

FIG. 9 is an example of a code segment in a physical Ethernet device driver's initialization routine; this code segment causes, in a fault-tolerant network interface, a switch over from a primary Ethernet controller to its alternate Ethernet controller if the primary Ethernet controller fails to initial its "qmode" (i.e. transmit and receive mode).

FIG. 10 is an example of a code segment in a transmission procedure for saving the timestamp of an Echo Request message.

FIG. 11 is an example of a code segment in an initialization procedure of a physical Ethernet driver; this code segment provides for a switch over to the alternate Ethernet controller when the primary Ethernet controller fails a configuration command.

FIG. 12 is an example comprising two code segments in a transmit interrupt handler of a physical device driver, for identifying an FTTP packet and for passing a return error code to a logical device driver.

FIG. 13 is an example comprising two code segments in a receive interrupt handler for passing the fault-tolerant Ethernet variable and a received OSI packet to the OSI receive procedure, and for preventing an FTTP packet from being discarded when TCP/IP is not running.

FIG. 14 is an example of a code segment in a receive interrupt error handler which determines the type of error reported by the LANCE integrated circuit; the error type is logged to allow data analysis.

FIG. 15 is an example of a code segment in a receive routine for calling the "poll_input" procedure of the logical device driver 450 when an FTTP packet is received.

FIG. 16 is an example of a code segment in a "watchdog" timer routine which runs a self-test periodically on an Ethernet controller; this code segment effectuates a switch over when a fault is revealed in a primary Ethernet controller.

FIG. 17 is an example of a code segment in a DMA procedure which copies data from the host computer's memory to the Ethernet controller; this code segment effectuates a switch over when the DMA copy out fails and the controller is the primary Ethernet controller.

FIG. 18 is an example of a code segment in a DMA procedure which copies data from the Ethernet controller to the host computer's memory; this code segment effectuates a switch over when the DMA copy in fails and the controller is a primary Ethernet controller.

DETAILED DESCRIPTION OF THE PREFERRED EMBODIMENTS

An embodiment of the present invention is provided in a fault-tolerant computer 101, to be discussed below in conjunction with FIGS. 1–3. One example of such a fault-tolerant computer is the Integrity S2 computer available from Tandem Computers Incorporated, Cupertino, Calif. Integrity S2 is a fault-tolerant, Unix-based computing platform. According to the principles of this invention, a fault-tolerant network interface is controlled by a logical device driver which is interposed between protocols of the physical and link layers and a higher level communication protocol. This logical device driver, as explained more completely below, has an interface compatible with standard higher level protocols at or above the network layer (i.e. ISO model layer 3), such as ISO-OSI and TCP/IP, implemented without requiring modification to these higher level protocols.

In addition, this logical device driver is compatible with standard physical and link level protocols, so that modification in these protocols is unnecessary to implement the fault-tolerant network interface. Thus, as is explained below, with respect to other network users or computers in the network, the fault-tolerant computer including the fault-tolerant network interface communicates using standard physical and link layer protocols. Consequently, the computers in accordance with the present invention can be added to or removed from any network supporting standard communication protocols.

Figure 1:
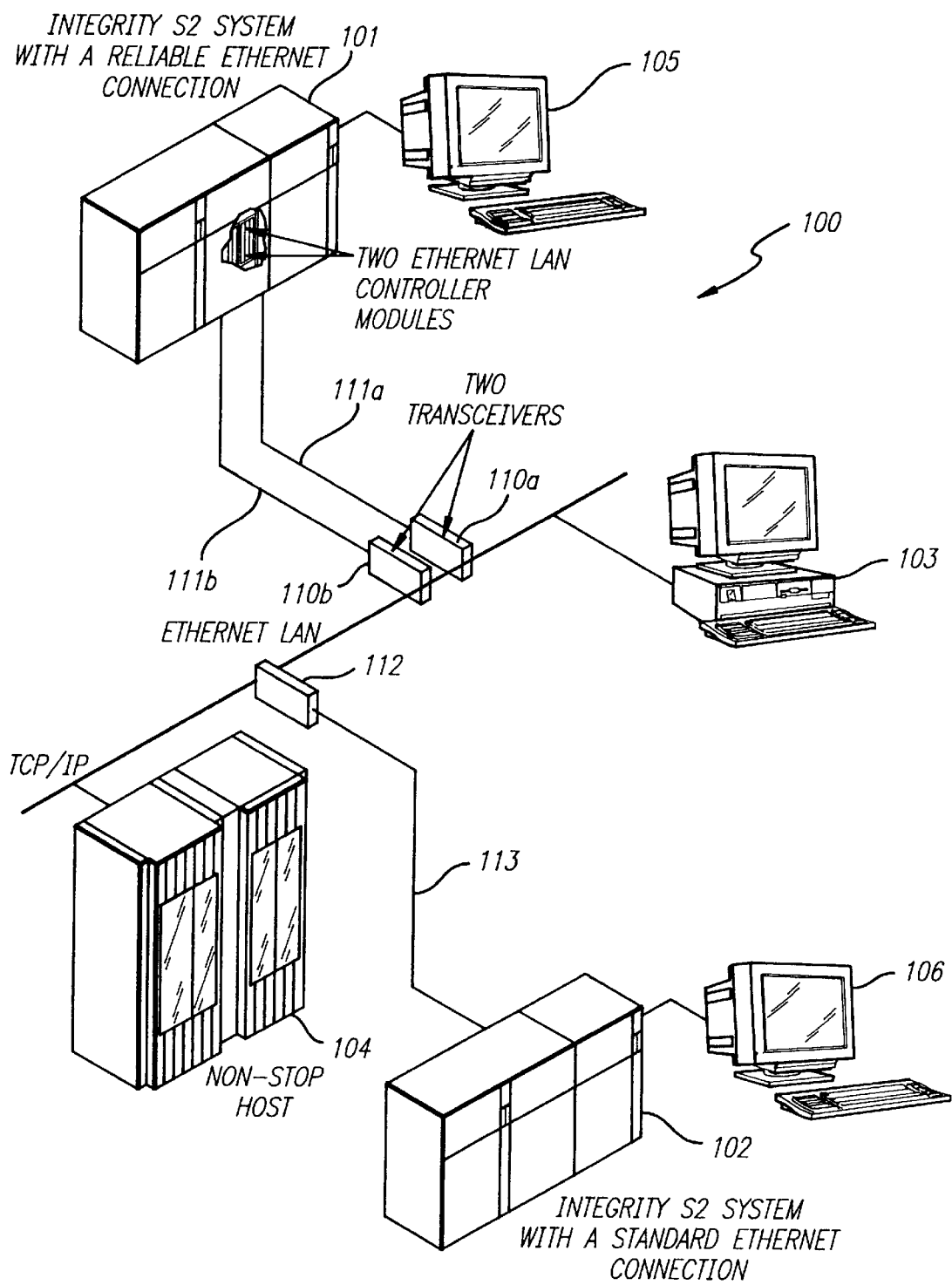
FIG. 1 shows a network 100 connecting various devices, including a fault-tolerant computer in accordance with the present invention.

Accordingly, FIG. 1 shows Ethernet LAN (local area network) 100 in which are connected (i) fault-tolerant computer 101 having a fault-tolerant Ethernet interface in accordance with the present invention, (ii) S2 computer 102 using a standard Ethernet interface (i.e. without the fault-tolerant Ethernet interface of the present invention), (iii) personal computer 103, and (iv) NonStop computer 104. (A NonStop computer, which is available from the aforementioned Tandem Computers, Inc., is another example of a fault-tolerant computer). Of course, the computers provided in FIG. 1 are intended only to be illustrative. Other computers capable of commuicating under standard Ethernet protocols can also be provided on Ethernet LAN 100. Further, even though Ethernet is used as an example of the computer network for the purpose of illustrating the embodiments of the present invention, one of ordinary skill in the art will appreciate that the present invention can be applied to other computer networks as well, in accordance of the teachings provided herein. Examples of such other networks include token ring, token bus and FDDI networks.

Terminals 105 and 106 are not connected to Ethernet LAN 100 directly, but are connected to computers 101 and 102 respectively. As seen in FIG. 1, fault-tolerant computer 101 is connected to Ethernet LAN 100 using two transceivers 110a and 110b over two cables 111a and 111b. Fault-tolerant computer 102's transceiver 112 and cable 113 illustrate a standard connection to Ethernet LAN 100. The transceivers 111a, 111b and 112 are each connected to an Ethernet controller (not shown) residing in the respective computers (i.e. 101 and 102) at the other ends of cables 111a, 111b and 113. In the parlance of the art, an Ethernet controller, the cable attached to the controller and the connector on the cable connecting the transceiver form an Attachment Unit Interface (AUI). The transceiver is known as the Media Access Unit (MAU). Thus, computer 101 is seen to be providing redundant AUIs and redundant MAUs.

Figure 2:
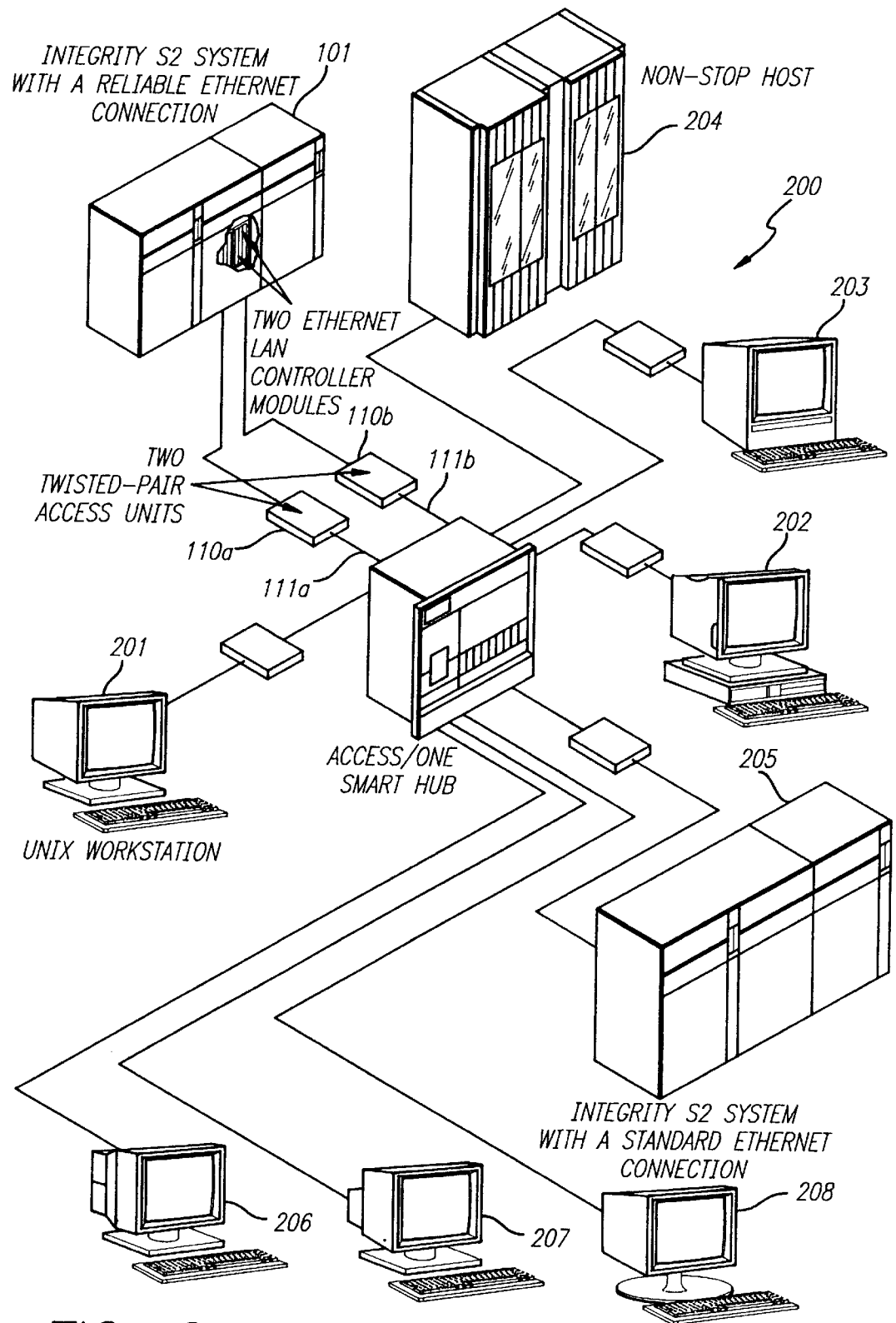
FIG. 2 shows another network 200 connecting various devices, including a fault-tolerant computer in accordance with the present invention; this network is provided by a "network hub" platform.

FIG. 2 is another example of a computer network in which fault-tolerant computer 101 can be deployed. As shown in FIG. 2, "network hub" (or "network concentrator") 200 provides both a local area network and its management. Network hubs can provide additional fault tolerance in the network medium by providing redundant cooling systems, redundant power supplies, multiple/redundant local area network connections, and "hot pluggability" (i.e. being able to add and remove hardware components without powering down the network hub). Such a network hub is typically capable of supporting many types of end-user devices, including asynchronous terminals, workstations, and personal computers of all types.

An example of a network hub is an ACCESS/ONE "smart hub" available from Ungermann-Bass Corporation. As shown in FIG. 2, fault-tolerant computer 102 is connected via transceivers 110a and 110b, respectively, over cables 111a and 111b to network hub 200. Also connected over standard network interfaces (i.e. each device is connected to the network by a single transceiver over a single cable) are Unix workstation 201, personal computers 202 and 203, NonStop computer 204, and S2 computer 205. Network hub 200 also provides connections to terminals 206, 207 and 208. These terminals need not be connected onto the same network as computers 201–205. Network hub 200 can also be used to provide point-to-point connection between devices. For example, network hub 200 may provide point-to-point connection between terminal 206 and S2 computer 102. Alternatively, network hub 200 may also act as multiple network concentrators forming multiple "subnetworks" to provide better utilization of equipment.

Figure 3:
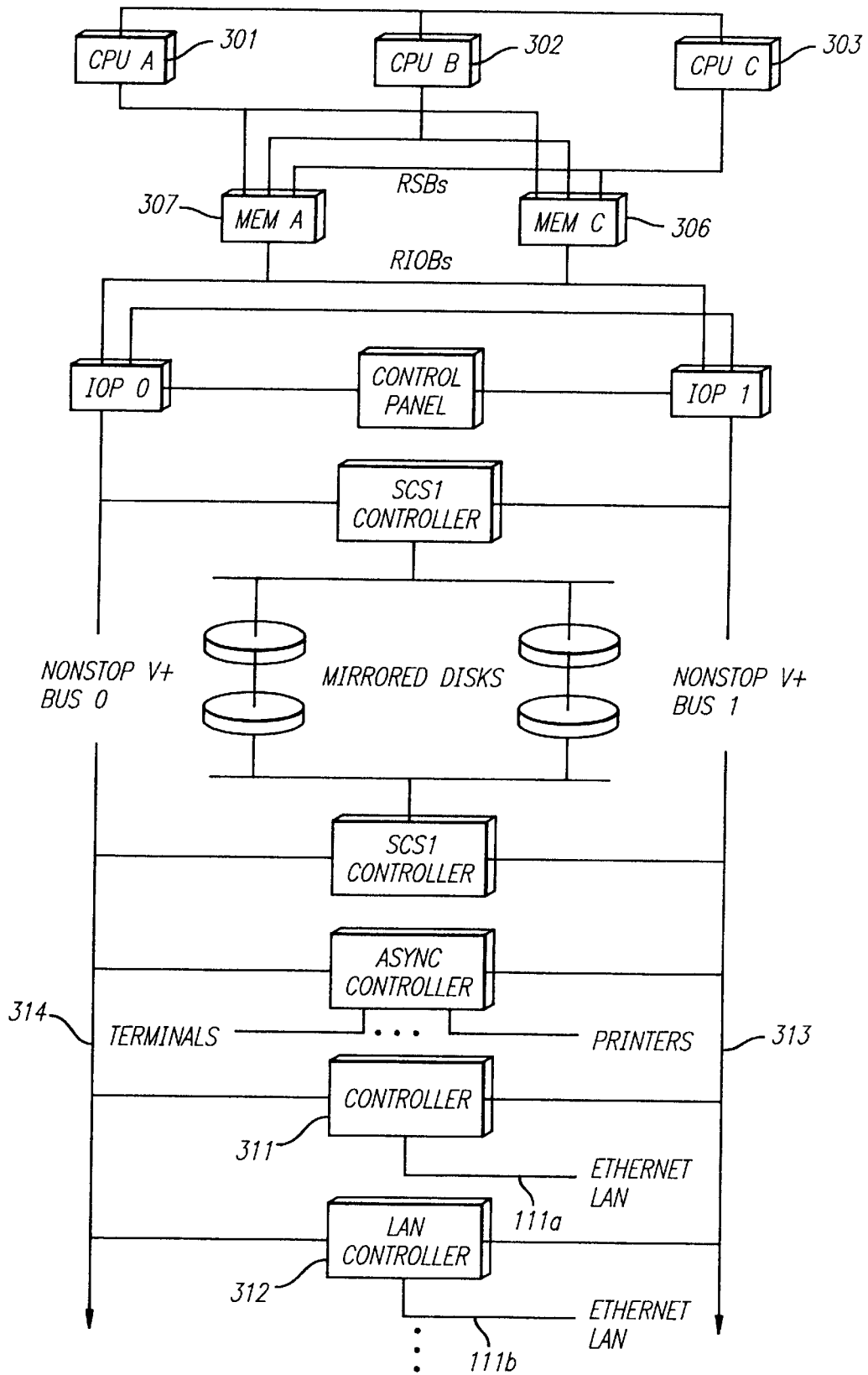
FIG. 3 shows an embodiment of the present invention in a fault-tolerant computer 101 having two Ethernet controllers 311 and 312 connected to the same local area network.

FIG. 3 is a configuration of the fault-tolerant computer 101 in accordance with the present invention. A detailed description of this fault-tolerant computer 101 can be found in "Integrity S2: A Fault-Tolerant Unix Platform," by Doug Jewett of Tandem Computers, Inc., hereby incorporated by reference in its entirety. Redundancy is provided in fault-tolerant computer 101 to provide fault tolerance with respect to single points of failure.

As shown in FIG. 3, three central processing units (CPUs) 301–303 of computer 101 are provided to operate in lock-step. To ensure robustness, a computation result is assumed correct only if provided by a majority of the CPUs. Two input/output (I/O) processors 304 and 305 provide redundancy in input/output operations. In addition, memory boards 306 and 307 implement a dual memory system (i.e. two copies are kept for each datum in memory). Mirrored disks 308 and 309 are also provided. Ethernet controllers 311 and 312 are used to control transceivers 110a and 110b (not shown) over cables 111a and 111b. The boards in computer 101 are connected by redundant internal busses 313 and 314, so that a communication path exists even in the event when one of the internal busses 313 and 314 fails.

An example of an Ethernet controller suitable for use as either Ethernet controller 311 or 312 is the Eagle Ethernet controller available from Interphase Corporation, Dallas, Tex. This implementation of computer 101 supports up to four Ethernet controllers. As is apparent below, Ethernet controllers other than Eagle Ethernet controllers can also be used in the present invention.

One requirement for an Ethernet controller used in the present invention is the ability to change during operation the 48-bit physical Ethernet address (also called the "MAC address" or "Media Access Control address"). This requirement is readily met by numerous Ethernet controllers, since the ability to change the physical Ethernet address during operation is available in most Ethernet controllers. However, it is customary that a factory-assigned MAC address is provided with each Ethernet controller and stored in a non-volatile memory component on-board the controller.

For the purpose of implementing the fault-tolerant network interface, it is desirable to avoid inadvertent duplication of MAC addresses. To ensure that conflicting MAC addresses do not exist, the vendor of the fault-tolerant network interface provides each station, e.g. computer 101, a MAC address containing an Organizationally Unique Identifier (OUI) identifying the presence of the fault-tolerant network interface. The OUI is contained in the 22-bit "OUI field" of the 48-bit MAC address. OUIs are administered by the Institute of Electronics and Electrical Engineers (IEEE) on behalf of the ISO, to allow identification of the vendor who reserved the OUI at the IEEE. The MAC address containing the fault-tolerant network interface vendor's OUI ensures that the station implementing the fault-tolerant network interface in accordance with the present invention will not experience a MAC address conflict in the network within which the station is deployed. As explained below, this arrangement allows the fault-tolerant computers in the network to maintain "hot pluggability" (i.e. inserting and integrating a component into an operating computer system without interrupting the system's operation).

The present invention is illustrated by way of example using the embodiment shown in FIG. 3. In accordance with the present invention, one of Ethernet controllers 311 and 312, say 311, is designated the primary Ethernet controller and assigned a first MAC address, preferably that MAC address having the OUI of the fault-tolerant network interface vendor. This is the MAC address used in the data link level protocol to uniquely identify a network interface on a station. Many high level protocols map this MAC address to a network logical address, or may use this MAC address as part of a logical network address.[1] The other Ethernet controller, i.e. Ethernet controller 312, is designated the alternate Ethernet controller and provided with a second MAC address. This second MAC address can be the factory-assigned address (i.e. not containing the reserved OUI). Since the alternate Ethernet controller 312 is not used in the present embodiment to receive messages from the network, other than the polling messages from the primary Ethernet controller 311 (see below), and because the alternate Etherent controller 312 acts substantially as a standby replacement for the primary Ethernet controller 311, this second MAC address need not be provided to other network users. All communication between computer 101 and other users of the network are transmitted and received over primary Ethernet Controller 311.

[1]. TCP/IP use the ARP (address resolution protocol) to dynamically bind a high level network address to a MAC address. OSI uses the MAC address as part of the NSAP (network Service Access Point) address, which is used by OSI-ISO's transport protocols.

The present embodiment is implemented in a System V version 3 UNIX environment which kernel is ported by Tandem Computers, Inc. for the CPUs of the Integrity S2 computer, using source code obtained from MIPS Computer, Inc. of Mountain View, Calif. (UNIX is a registered trademark of AT&T Corporation.) The present invention can be implemented in conjunction with numerous system services, such as illustrated in FIG. 4.

Figure 4:
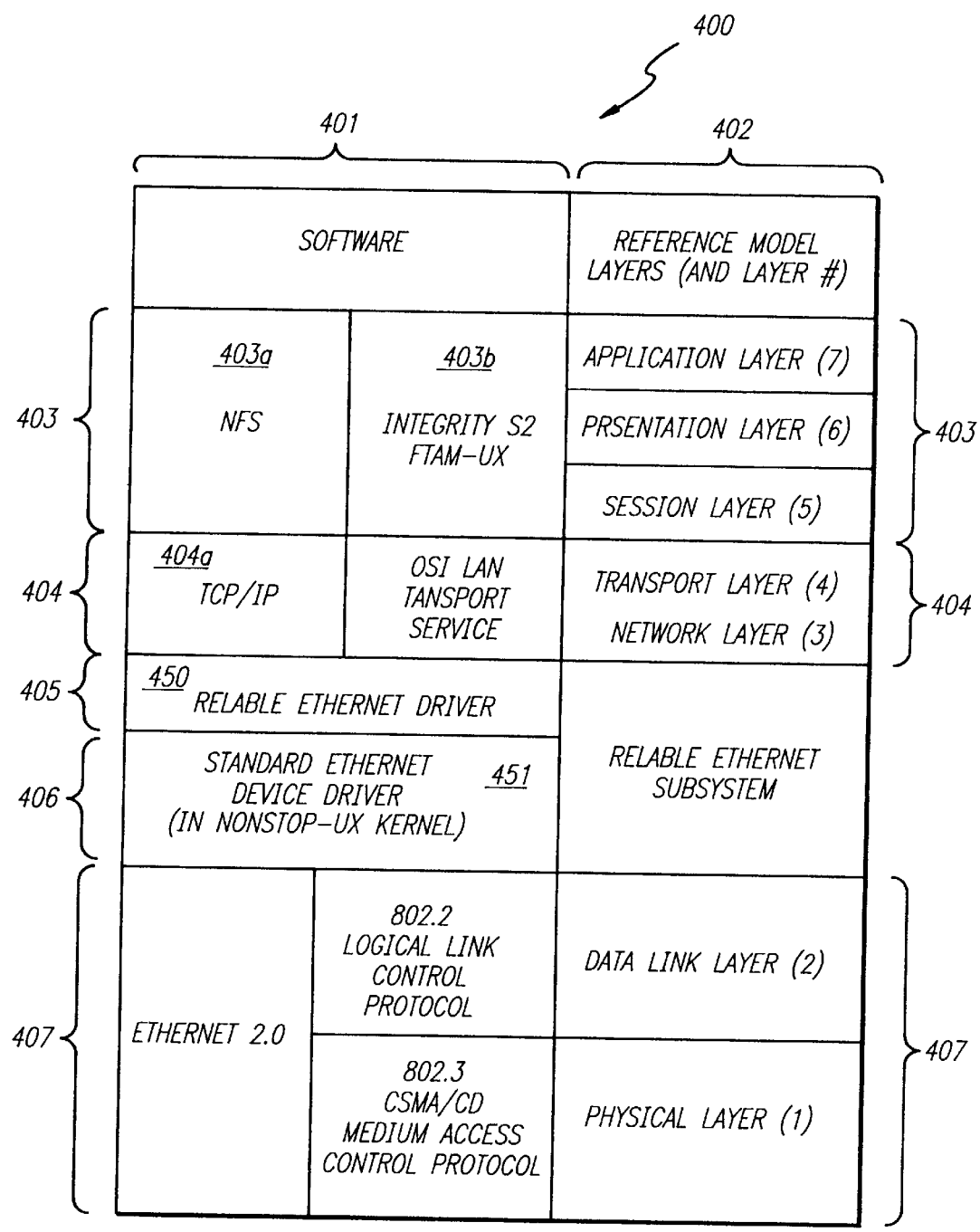
FIG. 4 shows two different protocol stacks, NFS-TCP/IP and ISO-OSI, within the same operational system environment in which logical Ethernet device driver 450 and physical device driver 451 can be provided in accordance with the present invention.

In FIG. 4, on the left hand side (indicated by reference numeral 401) of table structure 400 is provided two examples of "protocol stacks" beneath which the present invention can be implemented. On the right hand side (indicated by reference numeral 402) of table structure 400 is provided the ISO reference model to illustrate the relevant levels of communication protocols the software modules on the left hand side correspond.

Layer 403 illustrates the services which interface with application software. Examples of services in Layer 403 are file system 403a such as NFS (Network File System), available from Sun Microsystems of Mountain View, Calif., or a file transfer service 403b such as FTAM-UX (ISO-OSI's File Transfer, Access and Manipulation Protocol). NFS uses UDP (User Datagram Protocol), which is a connection-less service in the TCP/IP transport protocols. Services provided by the layer 403 correspond to the communication protocols of the application (7), presentation (6) and session (5) layers of the ISO model. Remote login commands, such as rlogin and telnet, and file transfer commands, such as ftp, are some other examples of application protocols based on connection-oriented transport protocols of TCP.

Layer 404, which provides communication services of the transport (4) and network (3) layers of the ISO model, can be provided by TCP/IP (404a), under NFS, or Integrity S2 OSI LAN Transport Service, under FTAM-UX. Logical device driver 450, which is capable of communicating with both TCP/IP and OSI LAN Transport Service, is provided in layer 405. Logical device driver (also called "pseudo device") 450 appears as one physical device driver to the higher level communication protocols above layer 405. Logical device driver 450, however, controls both primary and alternate Ethernet controllers 311 and 312 through a physical device driver 451. The higher level communication protocols treat logical device driver 450 in the same manner as a standard Ethernet device driver.

In this embodiment, physical device driver 451 controls both primary and alternate Ethernet controllers 311 and 312 because both Ethernet controllers are supplied by the same vendor and controllable using the same physical device driver. In a variation of the present embodiment, primary and alternate Ethernet controllers 311 and 312 can each be obtained from a different vendor and thus require its own physical device driver.

Logical device driver 450 and physical device driver 451 form the software environment of the fault-tolerant network interface of the present invention. Physical device driver 451, which typically resides in the kernel of the operating system, is represented by layer 406. Other than the modifications provided below, physical Ethernet device driver is substantially a "standard" Ethernet device driver. The physical Ethernet device driver 451 along with the MAU and AUI provide data link (2) and physical (1) protocol service. Using a watchdog timer known in the art, a physical Ethernet device driver periodically sends a diagnostic command to the Ethernet controller to ensure communication between the Ethernet controller and the host computer is maintained.

The examples given in table structure 400 to illustrate the physical and link level services are Ethernet 2.0, under NFS, and 802.2 Logical Link Control Protocol and 802.3 CSMA/CD (Carrier Sense Multiple Access/Collision Detection) Medium Control Protocol under FTAM-UX. Logical device driver 450 is described below in further detail.

Periodically, logical device driver 450 invokes a polling protocol for the purpose of exercising the transmission and reception capabilities of both primary and alternate Ethernet controllers 311 and 312, thereby detecting any latent faults in the primary and alternate Ethernet controllers 311 and 312, and exercising the primary Ethernet controller when the network traffic is minimal. Should the polling process reveal a fault of sufficient severity (see below) in primary Ethernet controller 311, primary Ethernet controller 311 is disabled and taken out of service by the logical device driver 450. In this embodiment, a "disable" command is written into the "short I/O space" of primary Ethernet controller 311. At this point, logical device driver 450 causes the alternate Ethernet controller 312 to assume the MAC address of the primary Ethernet controller 311 then in effect, by writing a command into the "short I/O space" of alternate Ethernet controller 312. A description of the Eagle controller instruction set may be found in "V/ETHERNET 4207 Eagle Ethernet 32-bit Platform Users' Guide," June 1989, hereby incorporated by reference. This User's Guide is available from Interphase Inc., Dallas, Tex.

Thereafter, all communication between computer 101 and other network users are transmitted and received by the network through alternate Ethernet controller 312. Because (i) alternate Ethernet controller 312 is a functional device in "hot standby" prior to the switch over operation, and (ii) the switch over operation is effectuated by issuing commands to Ethernet controllers 311 and 312 executable within the higher level protocols' time-out period, the switch over operation is transparent with respect to both other network users and the higher level communication protocols. Thus, a single point of failure in either the AUI or the MAU does not interrupt communication between computer 101 and other network users.

Further, because a unique MAC address is assigned to each fault-tolerant network interface, a duplicate MAC address conflict does not arise when an Ethernet controller previously switched out because of a fault is reintroduced in the network after repair. Such conflict may arise if each Ethernet controller is known by its factory-assigned MAC address, because the factory-assigned MAC address of a switched-out Ethernet controller is already assumed by its alternate in the fault-tolerant network controller. With the unique MAC address for each station with fault-tolerant network interfaces, Ethernet controllers can be reintroduced into a "hot-pluggable" computer without risk of MAC address duplication.

Logical device driver 450 is described next.

Creation and deletion of logical device driver 450

A user level command rlancfg is created to "create" or "delete" a configured fault-tolerant Ethernet device. By creation is meant the process of configuration (or "installation") of the fault-tolerant Ethernet interface. After configuration, communication between the higher level communication protocols with logical device driver 450 can begin. To prevent inadvertent or untutored interference with the operation of fault-tolerant Ethernet interface, access rights for creation and deletion of logical device driver 450 is restricted in the present embodiment to a few trusted users or processes known as "super users". The following command creates logical device /dev/renet0:

rlancfg -m /dev/renet0 enet0 enet1 -1 30 -r 1 -n 3

When this command rlancfg is executed, the system locates the logical device driver 450 through the special file /dev/renet0. An example of an implementation of command rlancfg is included in the Microfiche Appendix A and incorporated herein by reference. This implementation of command rlancfg uses SVR3 UNIX, which provides the Berkeley BSD 4.3 implementation of TCP/IP. When the STREAMS facility is available in the UNIX kernel, the necessary protocol suites (e.g. specifying the NFS-TCP/IP-Ethernet 2.0 "stack" shown in FIG. 4) can be assembled by the STREAMS facility using "ioctls" calls. An explanation of the STREAMS facility can be found, for example, in "STREAMS Programmer's Guide", available from Prentice Hall, publisher. Using the STREAMS facility greatly simplifies adapting logical device driver 450 into the environments of the numerous system services available.

Arguments enet0 and enet1 in command rlancfg are the names of the primary and alternate Ethernet controllers 311 and 312 which will map into the physical device driver 451. Primary and alternate Ethernet controllers 311 and 312 are installed previously using the S2 computer's cfinstall command. The value appearing after the flag -1 sets the interval between invocation of the polling protocol to, in this instance, 30 seconds. The value appearing after the -r flag sets the time to wait between retransmissions when a polling packet is not received by the recipient. In this instance, the retransmission interval is set to be one second. Finally, the value appearing after the -n sets the maximum number of retransmissions allowed when a polling packet is not received by the recipient.

Upon power-up, the primary and alternate Ethernet Controllers 311 and 312 are in the "INIT" hardware state (see below). Polling in the fault-tolerant network interface begins after the higher level protocols, such as TCP/IP, have begun running. After the first successful exchange of polling messages (explained below), the primary and alternate Ethernet controllers 310 and 311 are functional and considered "ONLINE".

The following command deletes the fault-tolerant Ethernet configuration for the device /dev/renet0:

rlancfg -d /dev/renet0

To prevent interruption of a connection, command rlancfg will fail when attempting to delete logical device driver 450 when a higher level protocol, e.g. TCP/IP, is running.

In this embodiment, the rlancfg command can be invoked with any number of the -r, -1, or -n flags, or without any arguments at all. When invoked with one or more parameter flags, the corresponding parameter or parameters are modified. When invoked without an argument, a listing of the status of the fault-tolerant Ethernet is provided. Status information provided by command rlancfg includes the state (described below) of logical device driver 450, and the hardware and diagnostic states of primary and alternate Ethernet controllers 311 and 312. The rlancfg command also reports the current values of the polling interval, the retransmission interval and the number of retransmissions paramters.

Since it is within ordinary skill in the art of device drivers to provide the procedures for creation and deletion of a logical device, the detailed description of the rlancfg command is omitted.

The Polling Protocol of Logical Device driver 450

Polling exercies both tranmission and reception capabilities of primary and alternate Ethernet controllers 311 and 312. In this embodiment, a protocol called the Fault Tolerant Polling Protocol (FTPP) is provided. Under FTTP, polling is effectuated by causing primary and alternate Ethernet Controllers 311 and 312 to each send the other a recognizable packet ("Echo Request message") at polling intervals specified in command rlancfg. If the Echo Receive message (described below) is not received by the recipient, retransmission occurs at the most recently specified retransmission interval up to the maximum number of retries specified.

Figure 5:
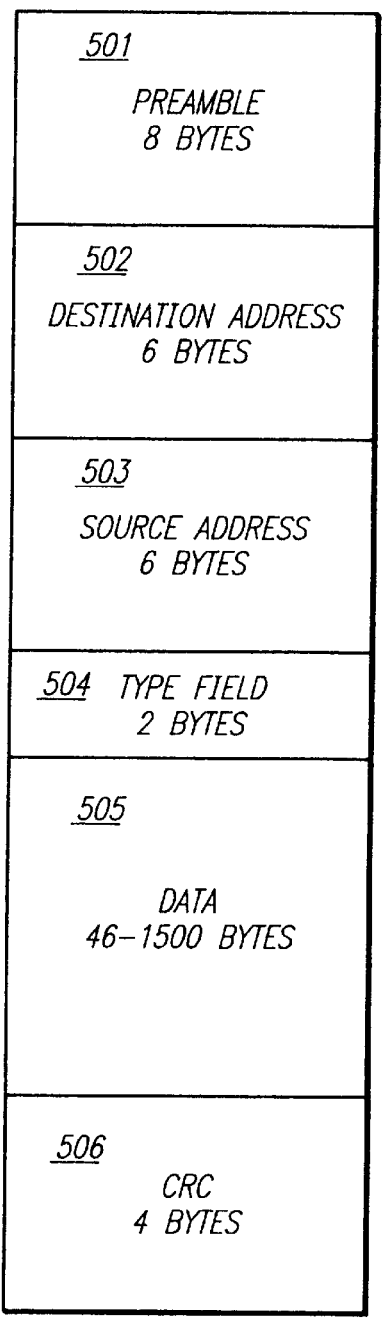
FIG. 5 shows an Ethernet frame format.

The Echo Receive message is sent using the basic Ethernet frame format, which is indicated by the structure labelled 500 in FIG. 5. As shown in FIG. 5, the first eight bytes (indicated by reference numeral 501) of an Ethernet packet is a preamble, which consists of alternating one's and zero's to facilitate synchronization. The next six bytes (indicated by reference numeral 502) form the destination address, which is the MAC address of the recipient. Destination address 502 is followed by six bytes of source address 503, which is the MAC address of the sender. A 2-byte type field 504 then follows, indicating the nature of the data included in data field 505. To distinguish an FTPP packet from all other possible Ethernet packets, a unique type code ("FTPP code") is reserved at Xerox Corporation, which administers type codes for standard Ethernet communication. Data field 505, which may be between 46–1500 bytes in an Ethernet packet, contains the Echo Request message. In the present embodiment, since the Echo Request message has only ten bytes of data defined (see below), the data field has the minimum size of 46 bytes. Data field 506 is followed by four bytes of checksum (CRC), which is a 1's complement sum of all the fields 501–506 prior to the CRC field 507.

Figure 6:
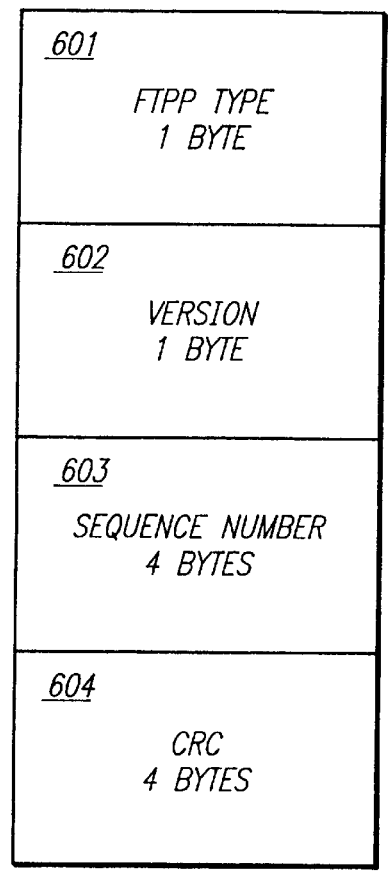
FIG. 6 shows the Echo Request message under FTPP (Fault Tolerant Polling Protocol), in accordance with the present invention.

The Echo Request message (indicated by reference numeral 600) is shown in FIG. 6. The first field in the Echo Request message is "type" field 601 indicating the message type. In this embodiment of the FTPP, only the "Echo Request message type" (given code '0') is defined. 1-byte "version" field 602 follows type field 601. Version field 601 contains the version number of the FTPP of logical device driver 450. Following version field 602 is 4-byte sequence number 603, which distinguishes one Echo Request message from another. Finally, 4-byte checksum 604, which is a 1's complement checksum of preceding fields 601–603, is provided for error checking purpose.

To provide further analysis of the fault-tolerant Ethernet interface, physical device driver is modified to allow reporting a number of transmit and receive errors detected by the AM7990 LANCE and the AM7992 SIA integrated circuits in the Interphase Eagle Ethernet controller. (The LANCE and SIA integrated circuits implement the Ethernet physical and link level protocols). The transmit errors detected are reported either in the LANCE's Control and Status register or the Transmit Descriptor word 3, both of which are available for examination by the physical device driver. Likewise, the receive errors detected are reported both in the Lance's Control and Status register and in the Receive Message Descriptor word 1. The detected errors are summarized in Table 1 as follows:

TABLE 1

| Transmit errors: | Receive errors: |
|---|---|
| 1. Babble error | 1. Missed packet error |
| 2. Collision Error | 2. Framing error |
| 3. Memory error | 3. Overflow error |
| 4. Buffer error | 4. CRC error |
| 5. Underflow error | 5. Buffer error |
| 6. Late collision error | |
| 7. Loss of carrier error | |
| 8. Retry error | |

Detailed descriptions of both the LANCE and SIA integrated circuits and explanation of these errors are found in "Communication Procedure Data Book, Thompson Components—Mostek Corp., September 1987", hereby incorporated by reference in its entirety.

In the present embodiment, physical device driver 451 is modified from the standard Eagle Ethernet controller device drivers in the following respects:

1. A procedure "egl_loop" is included to perform an "external loop-back test," in which the Etherenet controller is put into the "loop back" mode to receive a data packet addressed to itself. The loop-back test determines the integrity of Ethernet controller by exercising both transmitting and receiving functions simultaneously. An example of the procedure "eql_loop" is provided in FIG. 7.

2. In the initialization procedure, the Ethernet controller to be assigned as primary Ethernet controller is provided with a MAC address having the fault-tolerant network interface vendor's OUI, whereas other Ethernet controllers, including the alternate Ethernet controller is provided the factory-assigned address. An example of a code segment performing this function is provided in FIG. 8.

3. In the initialization procedure, if either the primary or the alternate Ethernet controller fails during initialization, a fault-tolerant Ethernet interface is configured in the DEGRADED state. If both primary and alternate Ethernet controllers fail during initialization, a fault-tolerant Ethernet interface is configured in a DOWN state. An example of a code segment performing this function is provided in FIG. 9.

4. Before sending an Echo Request message in a transmission procedure, the timestamp of the message is saved for use by the transmit interrupt handler to determine if the transmitted packet is an Echo request message. An example of a code segment performing this function is provided in FIG. 10.

5. In a initialization procedure, a switch over from the primary Ethernet controller to the alternate Ethernet controller is performed when the primary Ethernet controller fails a configuration command. An example of a code segment performing such function is provided in FIG. 11.

6. In a transmission error interrupt handler routine, the code returned by the LANCE integrated circuit is examined if a transmit error occur. If the timestamp verifies that the packet in question is an FTPP packet, the return error code is passed to a routine "poll_terror" in logical device driver 450. An example comprising two code segments for performing this function is provided in FIG. 12. The first code segment determines if the transmit packet has a LANCE error. The second code segment examines the timestamp for a poll packet and calls the poll_terror routine.

7. In a receive interrupt handler procedure, the fault-tolerant Ethernet variable is passed with an OSI packet received to the OSI receive procedure, if the packet is received by the primary Ethernet controller. Additionally, an FTPP packet received is not discarded, even if the higher level TCP/IP protocols are not running. An example comprising two code segments for performing such functions described here for the OSI packet and the FTTP packet when TCP/IP is not running are provided in FIG. 13. The first code segment handles the OSI packet. The second code segment prevents discard of an FTPP packet, even though TCP/IP is not running.

8. In a receive interrupt error handler, the error code returned by the LANCE integrated circuit is examined to determine the error type. For each type of error determined, an event is logged in the knowledge database for "thresholding" (see below). An example comprising a code segment for performing this function is provided in FIG. 14.

9. In a receive procedure, a "poll_input" procedure of the logical device driver 450 is called when an FTPP packet is received. (This is where the Ethernet type code for FTPP is used.) An example of a code segment for performing this function is provided in FIG. 15.

10. In a "watchdog" timer routine which periodically self-tests the Ethernet controller, a switch over is performed if the Ethernet controller is the primary Ethernet controller and the self-test reveals a fault in the Ethernet controller. An example of code segment for performing this function is provided in FIG. 16.

11. In a DMA procedure which copies data from the host computer's memory to the Ethernet Controller, a switch over to the alternate Ethernet controller is performed if a copy out error occurs in the primary Ethernet controller. An example of a code segment performing this function is provided in FIG. 17.

12. In a DMA procedure which copies data from the Ethernet controller to the host computer's memory, a switch over to the alternate Ethernet controller is performed if a copy in error occurs in the primary Ethernet controller. An example of a code segment performing this function is provided in FIG. 18.

From the transmit and receive error states resulting from the exchange of Echo Request messages sent between primary and alternate Ethernet controllers 311 and 312, logical device driver 450 sets the values of four logic state variables: "ATOK" (alternate transmitted properly), "AROK" (alternate received properly), "PTOK" (primary tranmitted properly) and "PROK" (primary received properly). From the values of these variables, logical device driver 450 determines the courses of action to take.

In fiber optic transceivers, a transmit fiber fault or a receive fiber fault error may not always result in a transmit error. Thus, in some situations (see table below), it is necessary to run an external loop-back test on one or both primary and alternate Ethernet controllers to determine where a fault occurs.

The courses of action taken in accordance with these state variables are shown in Table 2 below (an underlined state variable indicates that the value of the state variable is false):

TABLE 2

| Error States | Course of Action |
|---|---|
| PTOK, PROK, ATOK, AROK | fault-tolerant network interface fuctional, no action required. |
| PTOK, PROK, ATOK, <u>AROK</u><br>PTOK, <u>PROK</u>, ATOK, AROK<br>PTOK, PROK, ATOK, AROK<br>PTOK, PROK, ATOK, <u>AROK</u> | Primary transmit error:<br>  1. run external loop-back<br>     test on alternate.<br>  2a. if alternate OK, switch<br>     over;<br>  2b. otherwise, report<br>     double fault. |
| PTOK, <u>PROK</u>, ATOK, AROK<br>PTOK, PROK, <u>ATOK</u>, AROK<br>PTOK, PROK, <u>ATOK</u>, AROK<br>PTOK, <u>PROK</u>, <u>ATOK</u>, AROK | Alternate transmit error:<br>  1. run external loop-back<br>     test on primary.<br>  2a. if primary OK, then<br>     report single fault;<br>  2b. otherwise, report<br>     double fault. |
| PTOK, PROK, ATOK, <u>AROK</u><br>PTOK, <u>PROK</u>, ATOK, AROK<br>PTOK, PROK, ATOK, <u>AROK</u> | Receive errors:<br>  1. run external loop-back<br>     test on both primary and<br>     alternate.<br>  2a. if both loop-back tests<br>     fail, report double<br>     fault;<br>  2b. if only primary fails,<br>     switch over;<br>  2c. if only alternate<br>     fails, report error. |
| PROK, PTOK, ATOK, AROK<br>PTOK, PROK, <u>ATOK</u>, <u>AROK</u><br>PTOK, PROK, <u>ATOK</u>, AROK<br>PROK, PTOK, <u>ATOK</u>, AROK | Transmit errors in both alternate and primary:<br>  1. report double fault |

Logical device driver 450 logs all faults encountered. Logical device driver 450 declares polling successful if both alternate-to-primary and primary-to-alternate polls are successful. During the polling period, primary Ethernet controller 311 continues to handle normal network traffic, i.e. receiving from and transmitting to other network users. An exemplary implementation of logical device driver 450 is provided in the Microfiche Appendix A, herein incorporated by reference.

Fault Handling and Reporting

The fault-tolerant Ethernet interface responds to "hard" and "soft" faults. A hard fault indicates a totally loss of function mandating the Ethernet controller experiencing the fault to be disabled. If a hard fault occurs at the primary Ethernet controller, a switch over is performed, after determining that the alternate Ethernet controller is functional. A soft fault is an error which may be encountered during the course of normal operation and does not necessarily indicate that one or both of the Ethernet controllers 311 and 312 are faulty. In the present embodiment, hard faults are handled by logical device driver 450, and soft faults are logged for examination periodically by a conventional knowledge-based diagnostic system, such as MIDAS. MIDAS is available from the aforementioned Tandem Computers, Inc. Of course, other suitable data analysis program, other than a knowledge-based program, can also be used. The MIDAS system directs a switch over from primary Ethernet controller 311 to alternate Ethernet controller 312 when the MIDAS system determines that the number of "soft errors" has met certain preset thresholds to justify the switch over ("thresholding").

In addition to reporting the hardware state of the fault-tolerant Ethernet interface, command rlancfg reports both the "hardware" states and "diagnostic" states of primary and alternate Ethernet controllers 311 and 312. The hardware states of each Ethernet controller are "INIT" (i.e. prior to initialization), "ONLINE" (i.e. functional), "DOWN" (i.e. unavailable due to user intervention or fault) and "ABSENT" (i.e. not installed in the system). In this embodiment, a controller may be removed from the system physically, but is considered installed until the system administrator issues the cfremove command. The cfremove command renders the controller "ABSENT". If the controller is powered-down or physically removed from its slot in the S2 computer enclosure, the controller is in the "DOWN" state. The hardware states of the fault-tolerant Ethernet interface are "ONLINE" (i.e. fault-tolerant), "DOWN" (i.e. unavailable) and "DEGRADED" (i.e. functional, but not fault-tolerant). The hardware states of the fault-tolerant Ethernet interface are derived from the hardware states of the component Ethernet controllers. The hardware states of the fault-tolerant Ethernet interface are summarized in Table 3 as follows:

TABLE 3 primary-><br>alternate<br>|<br>|<br>V

| | INIT | ONLINE | DOWN | ABSENT |
|---|---|---|---|---|
| INIT | DOWN | DEGRADED | DOWN | DOWN |
| ONLINE | DEGRADED | ONLINE | DEGRADED | DEGRADED |
| DOWN | DOWN | DEGRADED | DOWN | DOWN |
| ABSENT | DOWN | DEGRADED | DOWN | DOWN |

The diagnostic states of primary and alternate Ethernet controllers 311 and 312, which each indicate the state of the respective Ethernet controller after occurence of an error, are reported for data analysis and for providing information to the system administrator. The diagnostics states, which are set by a system such as MIDAS, are "PROBATION" (i.e. under monitoring to determine if a soft fault occurred), "LOOPBACK" (i.e. an external loopback test is being run), and "FAULT."

In construing the diagnostic states, a soft error is one which may be encountered in the course of normal operation, and which does not necessarily indicate a hardware fault in the Ethernet controller. Normally, an Ethernet controller is set not to receive the packets it transmits, except during LOOPBACK state, when an external loopback test is performed. The external loopback test validates the operations of the LANCE and SIA integrated circuits and the external cabling. The FAULT diagnostic state indicates that the Ethernet controller is DOWN as the result of a fault, rather than, for example, intervention by the system administrator. The fault-tolerant Ethernet interface is considered ONLINE and fully tolerant even when one of primary and alternate Ethernet controllers 311 and 312 is in the ONLINE state and the other Ethernet controller is in the PROBATION state. The fault-tolerant Ethernet interface is in the DEGRADED state, however, when one of primary and alternate Ethernet controllers 311 and 312 is in the ONLINE state, and the other Ethernet controller is either in the LOOPBACK or FAULT state.

Note that a switch over by alternate Ethernet controller 312 for primary Ethernet controller 311 brings the fault-tolerant network interface from the ONLINE state, i.e. fully fault-tolerant, to a DEGRADED state. The ONLINE state is restored by reintegrating the faulty controller. Normally, the faulty controller is physically removed and a new controller inserted. The "downed" Ethernet controller is then powered up using the cfonline command.

Reintegration

Reintegration is initiated by the system administrator initializing the "downed" Ethernet controller. In reintegration, logical device driver 450 substantially reverses the sequence of events for disabling an alternate Ethernet controller from the fault-tolerant network interface. If the primary Ethernet controller is reintegrated, the alternate Ethernet controller assumes its factory-assigned address and the primary Ethernet is given the vendor assigned system unique MAC address. Echo Request messages are exchanged once after initialization. If the polling indicates ONLINE by both Ethernet controllers, the fault-tolerant Ethernet interface resumes the ONLINE state. An entry will be made in the error log to indicate reintegration. During reintegration, network packets are received by the active Ethernet controller prior to reintegration, so that no interruption of service at the connections maintained by higher level protocols.

The above detailed description is provided to illustrate the specific embodiments of the present invention provided herein and not intended to be limiting. One of ordinary skill will appreciate, upon consideration of the above detailed description and accompanying drawings, that numerous modifications and variations are possible within the scope of the present invention. For example, it is within the scope of the present invention to provide the fault-tolerant network interface in a redundant network medium, i.e. a network with redundant backbones. The present invention is defined by the following claims.

I claim:

1. An apparatus for providing a fault-tolerant interface for a computer, comprising:

first and second means for connecting said computer to said network, said first and second means for connecting being provided, respectively, with first and second identifiers for uniquely identifying said first and second means for connecting said computer to said network, said first means for connecting being initially enabled so as to allow data to flow between said network and said computer through said first means for connecting;

means for periodically detecting whether a fault has occurred in said first means for connecting, said means for detecting causing a first message to be sent through said first means for connecting to be received by said second means for connecting, and causing a second message to be sent through said second means for connecting to be received by said first means for connecting;

means for disabling said first means for connecting when said fault is detected;

means for substituting, in said second means for connecting, said first identifier for said second identifier when said fault is detected; and means for enabling, when said fault is detected, said second means for connecting so as to allow data to flow between said network and said computer through said second means for connecting.

2. A method for providing a fault-tolerant network interface for a computer, comprising the steps of:

providing first and second means for connecting said computer to said network, said first and second means for connecting being provided, respectively, with first and second identifiers for uniquely identifying said first and second means for connecting said computer to said network, said first means for connecting being initially enabled so as to allow data to flow between said network and said computer through said first means for connecting;

periodically detecting whether a fault has occurred in said first means for connecting by causing a first message to be sent through said first means for connecting to be received by said second means for connecting, and causing a second message to be sent through said second means for connecting to be received by said first means for connecting;

disabling said first means for connecting when said fault is detected;

substituting, in said second means for connecting, said first identifier for said second identifier when said fault is detected; and enabling, when said fault is detected, said second means for connecting so as to allow data to flow between said network and said computer through said second means for connecting.

3. An apparatus for providing a fault-tolerant network interface for connecting a computer to a computer network, comprising:

first and second means for connecting said computer to said network, said first means for connecting being provided with a unique identifier for identifying said first means for connecting said computer to said network, said first means for connecting being initially enabled so as to allow data to flow between said network and said computer through said first means for connecting;

means for detecting a fault in said first means for connecting; and means for disabling said first means for connecting when said fault is detected; and means for enabling, when said fault is detected, said second means for connecting by assigning said unique identifier to said second means for connecting, so as to allow data to flow between said network and said computer through said second means for connecting.

4. An apparatus as in claim 3, wherein said unique identifier is an "Organizationally Unique Identifier," separate and distinct from each of "media access control addresses" provided to said first and second means for connecting, thereby allowing said first and second means for connecting to be present in said network without causing an address conflict.

5. An apparatus as in claim 3, further comprising a device driver running on said computer for controlling said first and second means for connecting.

6. An apparatus as in claim 3, further comprising means for reporting to said computer the status of each of said first and second means for connecting.

7. An apparatus as in claim 3, wherein said means for detecting comprises means for testing both transmitting and receiving capabilities of said first and second means for connecting.

8. An apparatus as in claim 7, wherein said means for detecting further comprises a state machine, which receives from said means for testing test results of the transmitting and receiving capabilities of said first and second means for connecting, for determining the nature of said fault using said test results.

9. An apparatus as in claim 7, wherein said means for testing causes messages to be exchanged between said first and second means for connecting.

10. An apparatus as in claim 7, wherein said means for testing performs a loop-back test on each of said first and second means for connecting.

11. A method for providing a fault-tolerant network interface for connecting a computer to a computer network, comprising the steps of:

providing first and second means for connecting said computer to said network, said first means for connecting being provided with a unique identifier for identifying said first means for connecting said computer to said network, said first means for connecting being initially enabled so as to allow data to flow between said network and said computer through said first means for connecting;

periodically detecting whether a fault has occurred in said first means for connecting;

disabling said first means for connecting when said fault is detected; and enabling, when said fault is detected, said second means for connecting by assigning said unique identifier to said second means for connecting, so as to allow data to flow between said network and said computer through said second means for connecting.

12. A method as in claim 11, wherein said step of providing provides said unique identifier as an "Organizationally Unique Identifier," separate and distinct from each of "media access control addresses" provided to said first and second means for connecting, thereby allowing said first and second means for connecting to be present in said network without causing an address conflict.

13. A method as in claim 11, further comprising the step of providing a device driver running on said computer for controlling said first and second means for connecting.

14. A method as in claim 11, further comprising the step of reporting on demand to said computer the status of each of said first and second means for connecting.

15. A method as in claim 11, wherein said detecting step comprises the step of testing both transmitting and receiving capabilities of said first and second means for connecting.

16. A method as in claim 15, wherein said detecting step further comprises the step of providing a state machine, which receives said testing step test results of the transmitting and receiving capabilities of said first and second means for connecting, for determining the nature of said fault using said test results.

17. A method as in claim 15, wherein said testing step comprises the step of causing messages to be exchanged between said first and second means for connecting.

18. A method as in claim 15, wherein said test step further comprises the step of performing a loop-back test on each of said first and second means for connecting.

* * * * *